United States Patent
Chowdhury

(10) Patent No.: US 8,813,681 B2
(45) Date of Patent: Aug. 26, 2014

(54) TEATCUP LINER SERIES WITH VARYING MOUTHPIECE FLEXIBILITY

(71) Applicant: Mofazzal H. Chowdhury, Sun Prarie, WI (US)

(72) Inventor: Mofazzal H. Chowdhury, Sun Prarie, WI (US)

(73) Assignee: Technologies Holdings Corp., Houston, TX (US)

( * ) Notice: Subject to any disclaimer, the term of this patent is extended or adjusted under 35 U.S.C. 154(b) by 0 days.

(21) Appl. No.: 13/719,304

(22) Filed: Dec. 19, 2012

(65) Prior Publication Data

US 2013/0125822 A1    May 23, 2013

Related U.S. Application Data

(63) Continuation of application No. 12/836,630, filed on Jul. 15, 2010, now Pat. No. 8,375,894.

(51) Int. Cl.
*A01J 5/06* (2006.01)

(52) U.S. Cl.
USPC ..................... 119/14.47; 119/14.46

(58) Field of Classification Search
USPC .......... 119/14.47, 14.52, 14.49, 14.01, 14.18, 119/14.46, 14.48
See application file for complete search history.

(56) References Cited

U.S. PATENT DOCUMENTS

| 4,320,718 | A | 3/1982 | Hoefelmayr et al. |
| 4,572,106 | A | 2/1986 | Mills |
| 6,202,593 | B1 | 3/2001 | Maier et al. |
| 6,427,624 | B1 | 8/2002 | Briggs et al. |
| 6,631,694 | B1 | 10/2003 | Chowdhury |
| 6,745,718 | B1 | 6/2004 | Chowdhury |
| 6,776,120 | B1 | 8/2004 | Chowdhury |
| 2008/0072825 | A1* | 3/2008 | Petersson .................. 119/14.47 |
| 2009/0283043 | A1 | 11/2009 | Wiethoff et al. |
| 2011/0036297 | A1 | 2/2011 | Laney et al. |

FOREIGN PATENT DOCUMENTS

| DE | 10 2007 011 679 A1 | 9/2008 | ............... A01J 5/08 |
| EP | 1 334 656 A1 | 8/2003 | ............... A01J 5/08 |
| WO | WO 00/13489 A2 | 3/2000 | ............... A01J 5/00 |

OTHER PUBLICATIONS

GEA Farm Technologies; *ClassicPro Silicone Liners: The latest original liner is green and is called ClassicPro*; 6 pages, Jul. 7, 2010.
*PCT Invitation to Pay Additional Fees and, Where Applicable, Protest Fee* for International Application No. PCT/US2011/043515; 5 pages, Nov. 8, 2011.
*PCT Notification of Transmittal of the International Search Report and the Written Opinion of the International Searching Authority* for International Application No. PCT/US2011/043515; 16 pages, Jan. 20, 2012.
*New Zealand Intellectual Property Office; First Examination Report* for IP No. 605580; 1 page, Aug. 15, 2013.

* cited by examiner

*Primary Examiner* — Trinh Nguyen
(74) *Attorney, Agent, or Firm* — Baker Botts L.L.P.

(57) ABSTRACT

A teatcup liner comprises an upper mouthpiece, an intermediate barrel and a lower connecting tube. The upper mouthpiece further comprises a mouthpiece transition, a mouthpiece lip, and a groove on an outer surface of the upper mouthpiece to provide flexibility in the upper mouthpiece. The intermediate barrel extends along an axial direction for receiving a teat inserted axially thereinto through said mouthpiece.

8 Claims, 5 Drawing Sheets

| LINER | MOUTHPIECE LIP THICKNESS "A" (mm) | MOUTHPIECE TRANSITION THICKNESS "J" (mm) |
|---|---|---|
| L1 | 2.9 | 6.0 |
| L2 | 2.8 | 5.5 |
| L3 | 2.7 | 5.0 |
| L4 | 2.6 | 4.5 |
| L5 | 2.5 | 4.0 |

TEATCUP LINER SERIES WITH VARYING MOUTHPIECE FLEXIBILITY

TECHNICAL FIELD OF THE INVENTION

This invention relates to equipment for the dairy industry, and more particularly to a teatcup liner series with varying mouthpiece flexibility.

BACKGROUND OF THE INVENTION

In a milking machine, a plurality of teatcups are connected to respective teats suspending from the udder of a mammal, such as a cow. Each teatcup assembly has a teatcup liner or inflation around a respective teat and defining a milk flow passage within the liner below the teat, and a pulsation chamber outside the liner between the liner and a teatcup shell. The system has a milking cycle with an on portion and an off portion. Milk flows from the teat towards a milking claw during the on portion, and then to a storage vessel. During the off portion, the liner is collapsed around the teat, to aid in the circulation of body fluids. Vacuum pressure is continuously applied to the milk flow passage within the liner. Vacuum and ambient pressure are alternately and cyclically applied to the pulsation chamber between the liner and the teatcup shell, to open and close the liner.

SUMMARY OF THE INVENTION

In one embodiment, a teatcup liner comprises an upper mouthpiece, an intermediate barrel and a lower connecting tube. The upper mouthpiece further comprises a mouthpiece transition, a mouthpiece lip, and a groove on an outer surface of the upper mouthpiece to provide flexibility in the upper mouthpiece. The intermediate barrel extends along an axial direction for receiving a teat inserted axially thereinto through said mouthpiece.

In another embodiment, a teatcup liner series comprises in combination a plurality of related teatcup liners, each liner having an upper mouthpiece, an intermediate barrel and a lower connecting tube. The upper mouthpiece further comprises a mouthpiece transition and a mouthpiece lip. The barrel extends along an axial direction for receiving a teat inserted axially thereinto through said mouthpiece. The teatcup liner series comprises n said liners $L_1$ through $L_n$, wherein the mouthpiece transition has a transverse thickness measured perpendicular to said axial direction, and the transverse thickness of the mouthpiece transition decreases from $L_1$ through $L_n$.

Various embodiments of the invention may have none, some, or all of the following advantages. A liner series with increasing flexibility in the mouthpiece, decreasing axial thickness of the mouthpiece lip, and/or decrease transverse thickness of the mouthpiece transition from $L_1$ through $L_n$ allows a dairyman to choose the right balance and trade-off between milking speed/harvest and liner slippage for his particular needs. Other advantages will be readily apparent to one skilled in the art from the description and the appended claims.

BRIEF DESCRIPTION OF THE DRAWINGS

For a more complete understanding of the present invention and its advantages, reference is now made to the following description taken in conjunction with the accompanying drawings, in which.

DETAILED DESCRIPTION

Figure 1:
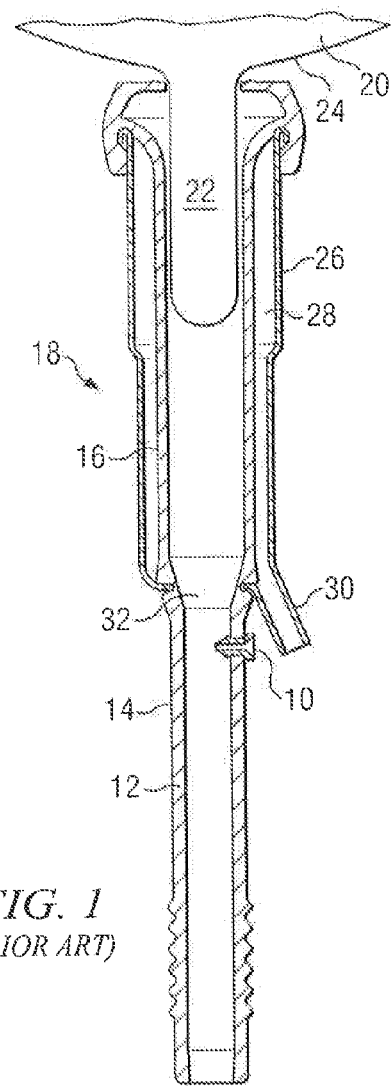
FIG. 1 illustrates one embodiment of a teatcup assembly.
Figure 2:
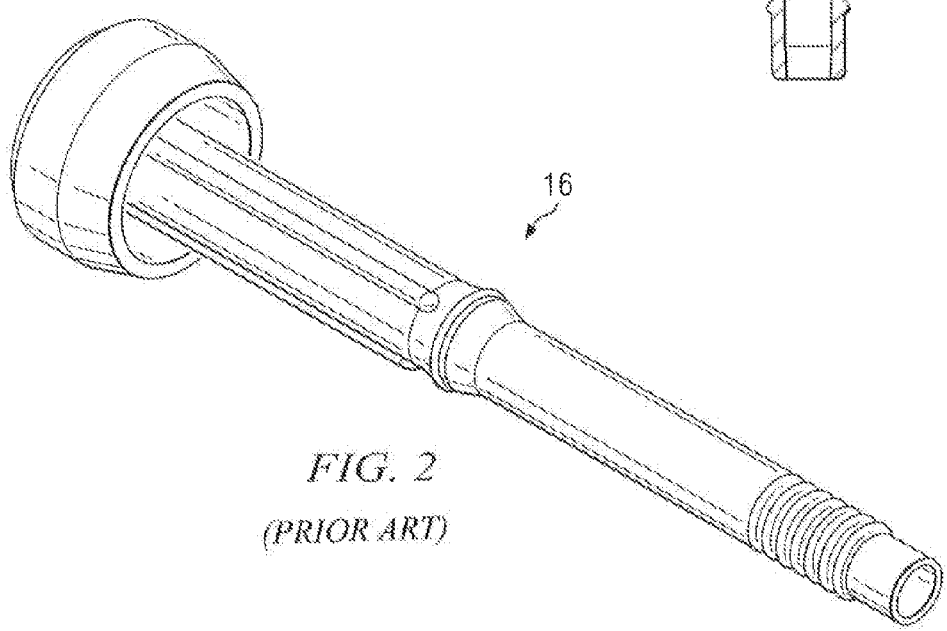
FIG. 2 illustrates an isometric view of a teatcup liner of FIG. 1.

FIG. 1 illustrates a teatcup assembly 18 for milking a mammal 20 such as a cow. Teat 22 suspending from udder 24 of the mammal extends into the liner. Teatcup shell 26 is typically a metal, or plastic, member defining an annular pulsation chamber 28 around liner 16 between the liner 16 and the teatcup shell 26 and having a pulsation port 30 for connection to a pulsator valve. Liner 16 is typically rubber or other flexible material. The lower end of milk tube portion 14 of the liner 16 provides a connection to a milking claw, which in turn supplies milk to a storage vessel. As noted above, vacuum pressure is continuously applied to milk passage 32 within the liner 16 through milk tube portion 14, and vacuum is alternately and cyclically applied to pulsation chamber 28 through port 30, to open and close liner 16 below teat 22. An air vent plug 10 may be inserted through the wall 12 of the milk tube portion 14 of the teat liner 16. A teat liner 16 is illustrated in isometric view in FIG. 2.

Figure 3:
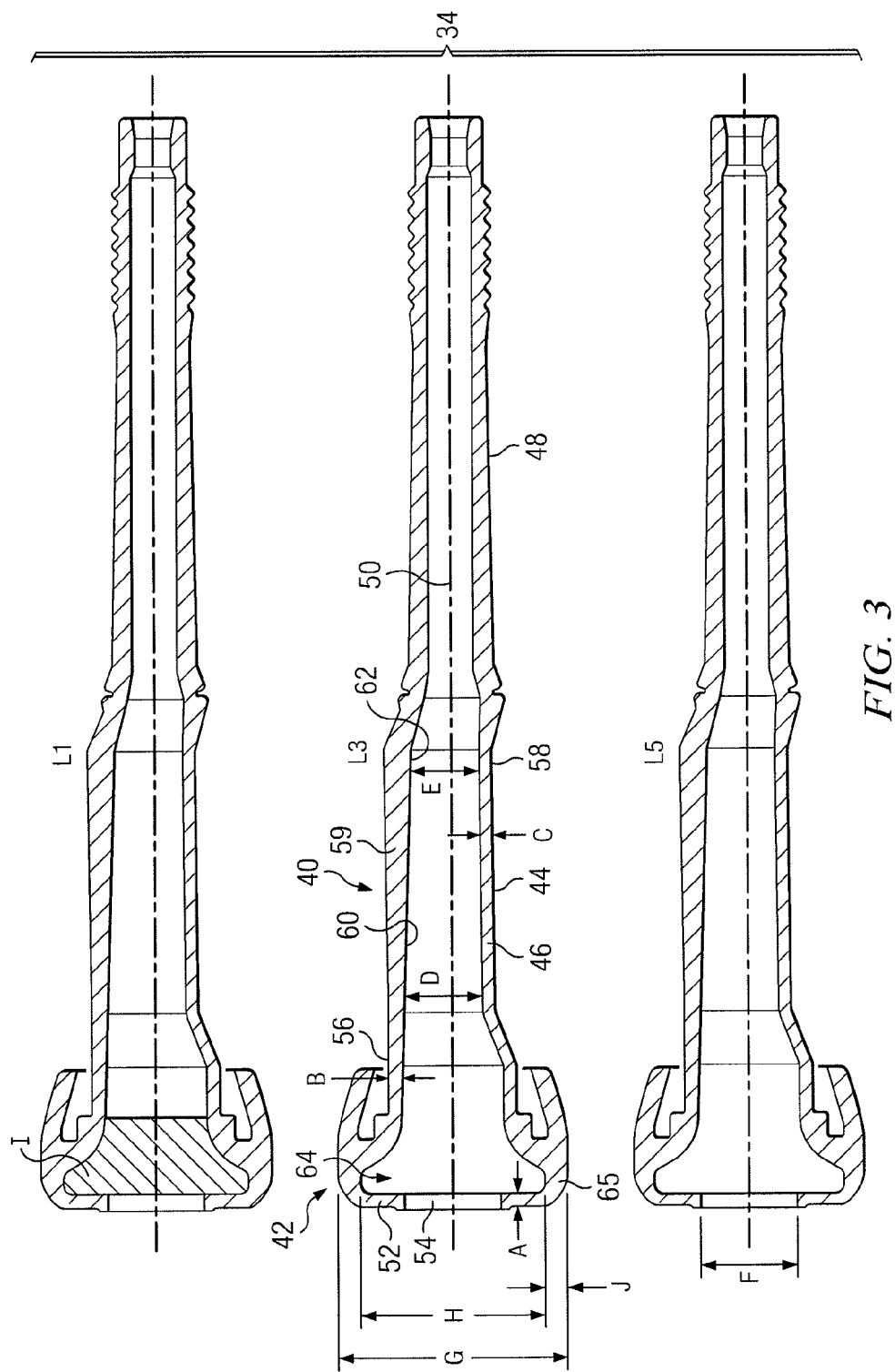
FIG. 3 illustrates one embodiment of a teatcup liner series.

FIG. 3 illustrates one embodiment of a teatcup liner series 34 including in combination a plurality of related teatcup liners 40 comprising n liners $L_1$ through $L_n$, for example, as shown as the three liners $L_1$, $L_3$, and $L_5$. Each liner 40 has an upper mouthpiece 42, an intermediate barrel 44 defined by a barrel wall 46, and a lower connecting tube 48. The barrel 44 extends along an axial direction 50 for receiving teat 22 inserted axially thereinto through mouthpiece 42. The mouthpiece 42 has a lip 52 having an aperture 54 therethrough for receiving teat 22. Lip 52 has an axial thickness A measured parallel to axial direction 50. Barrel wall 46 has axially spaced upper and lower portions 56 and 58, with ribs 59 extending longitudinally from at least the upper portion 56 to at least the lower portion 58. Upper portion 56 of barrel wall 46 has a transverse thickness B measured transversely to axial direction 50. Lower portion 58 of barrel wall 46 has a transverse thickness C measured transversely to axial direction 50. Upper portion 56 of barrel wall 46 has inner surfaces 60 defining a hollow interior with an upper transverse span D thereacross taken transversely to axial direction 50. Lower portion 58 of barrel wall 46 has inner surfaces 62 defining a hollow interior with a lower transverse span E thereacross taken transversely to axial direction 50. Lip aperture 54 has a transverse dimension taken transversely to axial direction 50 and defining a mouthpiece bore F. In one embodiment, transverse thickness C is thicker at upper transverse span D than it is at lower transverse span E.

Mouthpiece 42 has an outside transverse dimension taken transversely to axial direction 50 and defining mouthpiece outer diameter G. Mouthpiece 42 has a cavity 64 between lip 52 and upper barrel 56. Cavity 64 has a transverse dimension taken transversely to axial direction 50 and defining a cavity bore H. Cavity 64 has a volume I. Mouthpiece transition 65 of transverse thickness J connects the lip 52 to the remainder of upper mouthpiece 42 and is defined by dimensions G and H.

In one embodiment, the transverse thickness J of mouthpiece transition 65 decreases, such as continually, in the liner series from $L_1$ through $L_n$. Moreover, in one embodiment, the axial thickness A of lip 52 decreases, such as continually, in the liner series from $L_1$ through $L_n$. In some embodiments of a liner series, both the transverse thickness J of mouthpiece transition 65 and the axial thickness A of lip 52 decrease, such as continually, in the liner series from $L_1$ through $L_n$. In any of these embodiments, the change in thickness J of mouthpiece transition 65 may be achieved by maintaining the dimensions inside the mouthpiece 42 (e.g., transverse thickness H) while varying the dimensions outside of the mouthpiece 42 (e.g., transverse thickness G). In an alternative embodiment, the change in thickness J of mouthpiece transition 65 may be achieved by maintaining the dimensions outside the mouthpiece 42 (e.g., transverse thickness G) while varying the dimensions inside the mouthpiece 42 (e.g., transverse thickness H).

Figure 4:
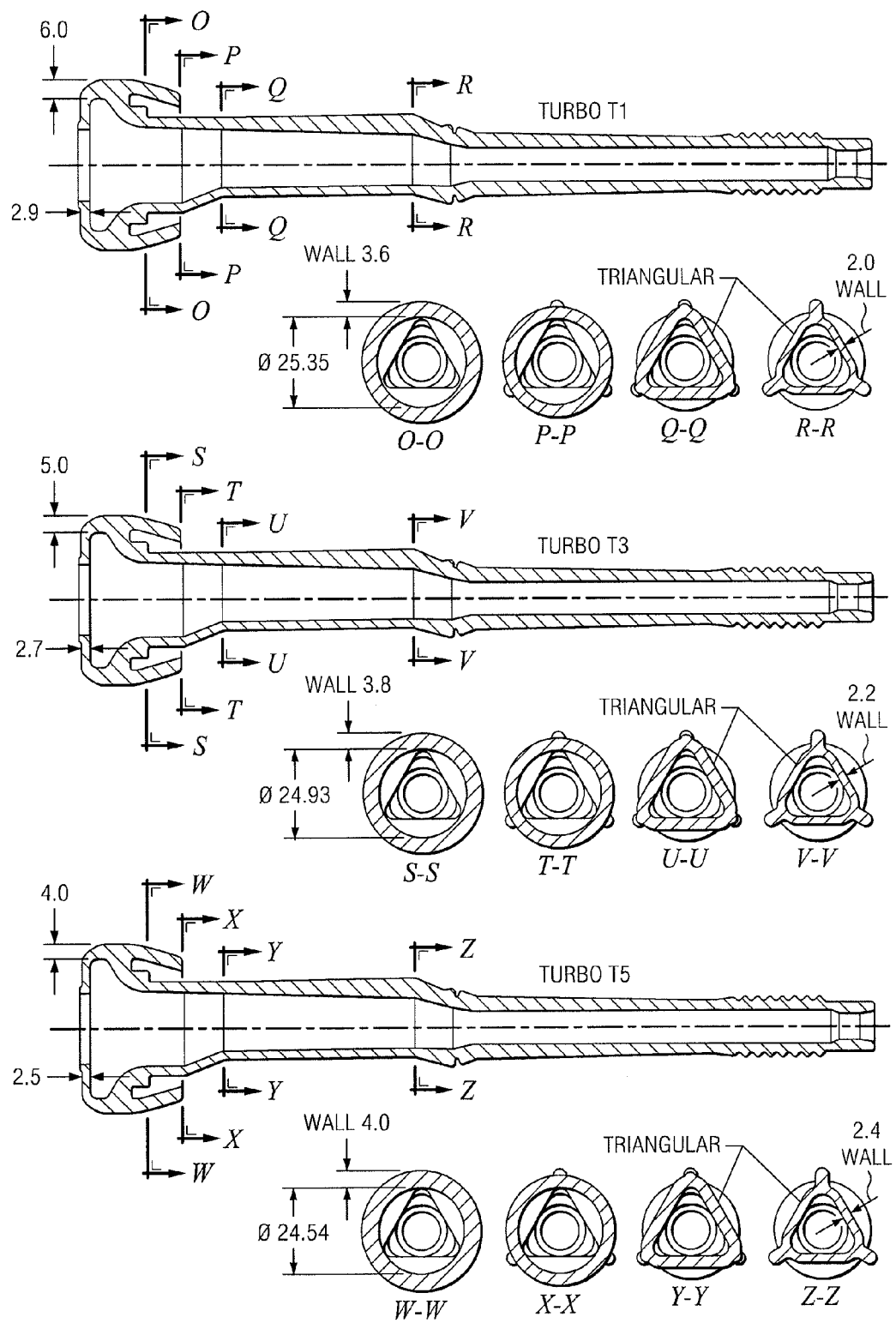
FIG. 4 illustrates one embodiment of the teatcup liner series with longitudinal and cross-sectional views.

FIG. 4 illustrates one embodiment of the teatcup liner series 34 with longitudinal and cross-sectional views. In particular, certain example dimensions are provided for various thicknesses (measured in millimeters). Moreover, cross-sections of each liner 40 in the series 34 are provided at various locations (e.g., along O-O, P-P, Q-Q, and R-R of liner L1; along S-S, T-T, U-U, and V-V of liner L2; and along W-W, X-X, Y-Y, and Z-Z of liner L3) along the length of a given liner 40.

Figure 5:
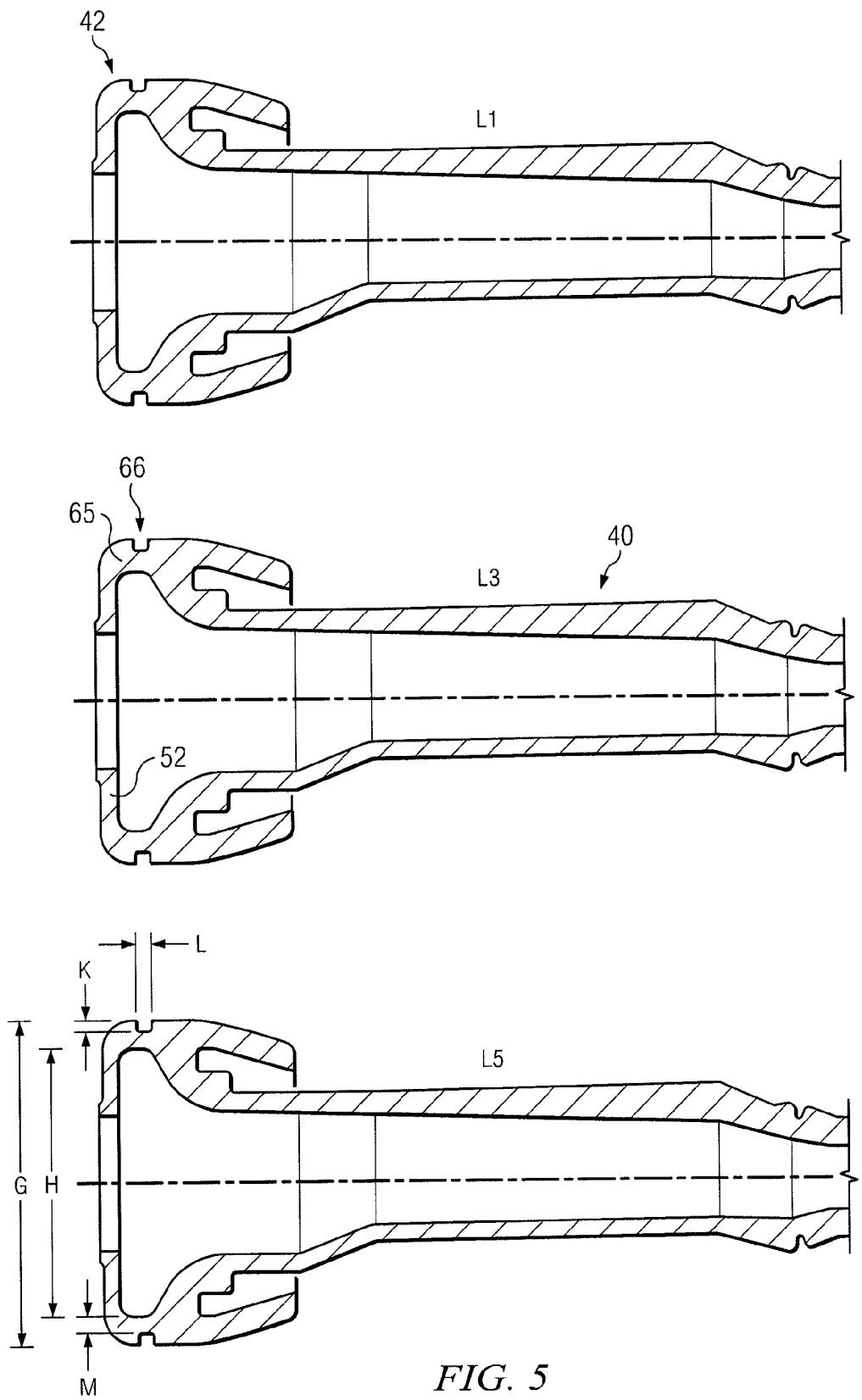
FIG. 5 illustrates an alternative embodiment of a liner used in a teatcup liner series.

Another embodiment of a liner 40 is shown in FIG. 5, wherein mouthpiece 42 (e.g., mouthpiece transition 65 and/or lip 52) has varying flexibility between models due to the presence of a groove 66 of varying depth K and/or width L, resulting in thickness M. Groove 66 may be located substantially in line with the largest diameter of the cavity bore H and may be used to change the thickness M of mouthpiece transition 65. For example, the thickness M of mouthpiece transition 65 may be decreased despite maintaining the dimensions inside and outside the upper mouthpiece 42 (e.g., transverse thicknesses H and G) by adding groove 66 having suitable depth K and/or width L. By increasing the size of groove 66, either by increasing depth K and/or width L, mouthpiece 42 comprises less material (e.g., rubber) to resist bending, thereby making mouthpiece 42 (e.g., mouthpiece transition 65 and/or mouthpiece lip 52) more flexible. In one embodiment, the liners of the liner series are made such that the flexibility of mouthpiece 42 (e.g., mouthpiece transition 65 and/or mouthpiece lip 52) increases in the liner series from $L_1$ through $L_n$. This may be achieved by increasing either or both of the depth or width of groove 66 in the liner series from $L_1$ through $L_n$. The milk flow rate through the liner series may be increased by increasing the flexibility of the mouthpiece 42 from $L_1$ through $L_n$. At the same time, however, the chances of liner slippage increase from $L_1$ through $L_n$ as the flexibility increases.

A construction with groove 66 would also be of benefit as a single liner, apart from a liner series, as it would provide a relatively thick mouthpiece 42 (e.g., mouthpiece transition 65 and/or lip 52) while allowing flexibility of the mouthpiece 42 (e.g., mouthpiece transition 65 and/or lip 52). For example, by increasing the thickness M of mouthpiece transition 65 (and/or by reducing the size of width L or depth K of groove 66), mouthpiece 42 can be made stiffer and by decreasing the thickness M of mouthpiece transition 65 (and/or by increasing the size of width L or depth K of groove 66), mouthpiece 42 can be made more flexible. Some stiffness in the mouthpiece 42 is appropriate in order to stand up to the vacuum pressure applied to the liner 40 during the milking process. In some embodiments, however, if the mouthpiece 42 is too stiff, liner 40 may actually restrict the flow of milk from the teat. By making mouthpiece 42 more flexible, the teat 22 may be pushed against mouthpiece lip 52 without constricting fluids, such as blood and lymph.

Figures 6, 7:
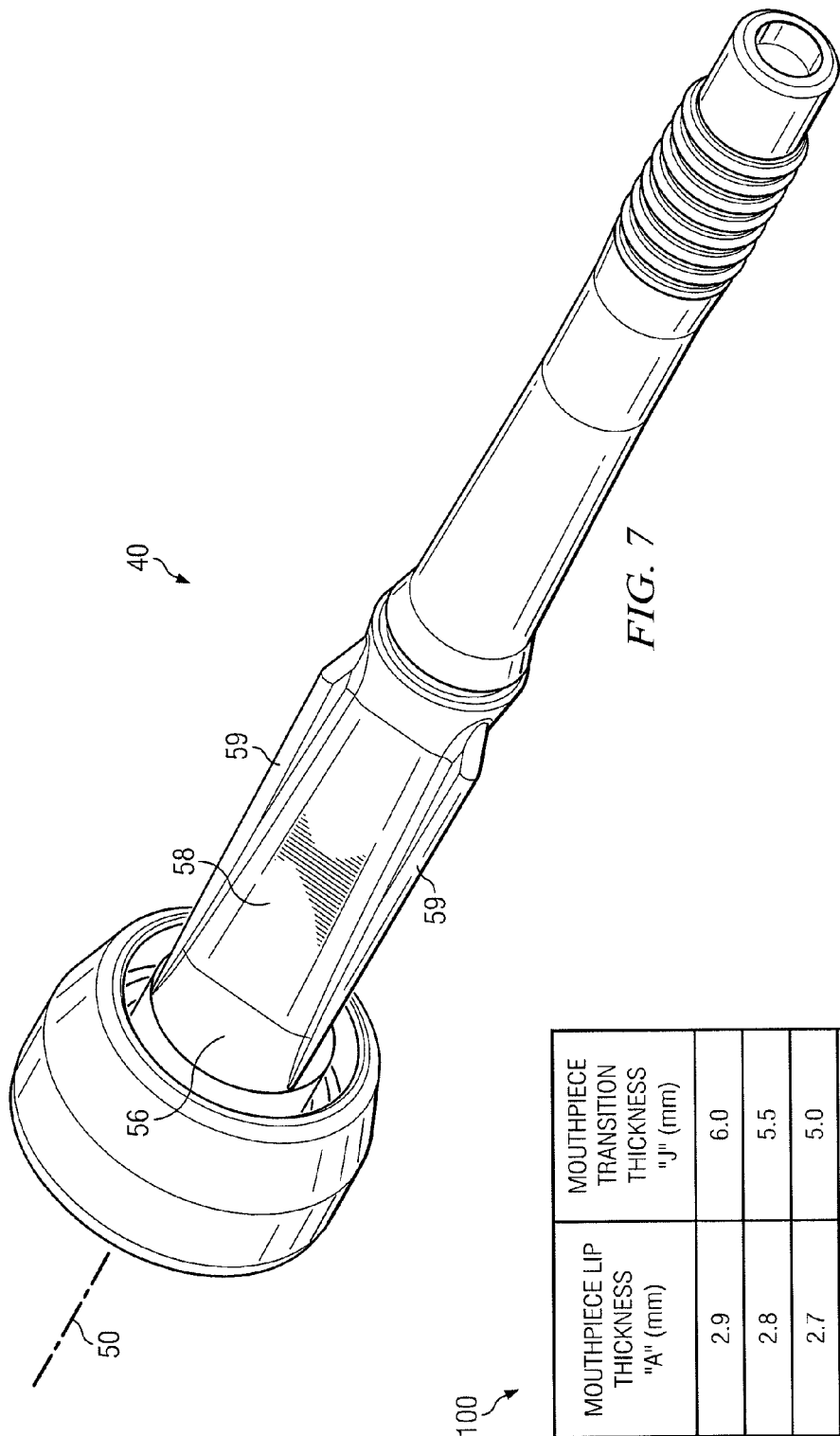
FIG. 6 illustrates a table of parameters that may vary from liner to liner in a teatcup liner series.
FIG. 7 illustrates an isometric view of a liner from the teatcup liner series of FIGS. 3 and 4.

In one embodiment, the parameters A and J are varied from liner to liner from $L_1$ through $L_n$, as indicated in the table 100 illustrated in FIG. 6. Table 100 provides example dimensions A and J provided in millimeters (mm). The disclosed combination enables selection of desired milking characteristics. Liner $L_5$ provides the highest milk harvest and highest milk speed, but also the greatest chance for liner slip. Liner $L_1$ provides the lowest chance for liner slip and also the lowest milk harvest and milking speed. The dairyman can choose the right balance and trade-off for his particular needs. As he moves top to bottom in table 100, liner slip increases as does milk harvest and milking speed. As he moves bottom to top in table 100, liner slip decreases as does milk harvest and milking speed.

Table 100 also indicates the amount of vacuum pressure that may be applied to the liner 40 in the milking system. In a liner series using liners 40 illustrated in either FIG. 3 or 4, the vacuum pressure setting of the milking system may be increased from $L_1$ through $L_n$ as a result of, for example, the increased flexibility of mouthpiece 42 from $L_1$ through $L_n$.

FIG. 7 illustrates an isometric view of a liner 40 from the teatcup liner series 34 of FIGS. 3 and 4. The upper portion 56 of liner 40 is round in lateral cross-section taken transversely to axial direction 50. The lower portion 58 of liner 40 is triangular in lateral cross-section taken transversely to axial direction 50. Ribs 59 extend longitudinally from at least the upper portion 56 to at least the lower portion 58. Ribs 59 extend laterally from the corners of the triangular cross-section. In one embodiment, ribs 59 extend laterally into the round cross-section area.

Although the example embodiments have been described in detail, it should be understood that various changes, substitutions, and alterations can be made hereto without departing from the scope of the disclosure as defined by the appended claims.

What is claimed is:

1. A teatcup liner comprising an upper mouthpiece and a barrel depending downwardly from said upper mouthpiece, said barrel extending axially along an axis for receiving a teat inserted axially thereinto through said mouthpiece, said barrel having an upper portion and a lower portion, said upper portion being round in lateral cross-section taken transversely to said axis, said lower portion being triangular in lateral cross-section taken transversely to said axis, with ribs extending laterally from corners of the triangular cross-section.

2. The teatcup liner of claim 1, wherein ribs on the triangular section extend into the round cross-section area.

3. The teatcup liner of claim 1, wherein the ribs extend longitudinally from at least the upper portion to at least the lower portion.

4. The teatcup liner of claim 1, wherein the ribs comprise three ribs.

5. The teatcup liner of claim 1, wherein the triangular cross-section has three corners with three respective sides extending therebetween.

6. The teatcup liner of claim 5, wherein the barrel has a barrel wall with a wall thickness transverse to the axis, and the wall thickness at the three sides is less than the wail thickness at the three corners.

7. The teatcup liner of claim 1, wherein the upper mouthpiece further comprises a mouthpiece transition, a mouthpiece lip, and a groove formed in an outer surface of the upper mouthpiece.

8. The teatcup liner of claim 7, wherein an inner dimension of the upper mouthpiece defines a cavity bore and the groove is located substantially in line with the largest diameter of the cavity bore.

\* \* \* \* \*